Oct. 11, 1955      H. L. CLARK      2,720,111

FORCE MEASURING ELECTRIC GAUGE

Filed Feb. 20, 1953

Inventor:
Howard L. Clark,
by Paul A. Frank
His Attorney.

United States Patent Office 2,720,111
Patented Oct. 11, 1955

2,720,111

FORCE MEASURING ELECTRIC GAUGE

Howard L. Clark, Ballston Lake, N. Y., assignor to General Electric Company, a corporation of New York Application February 20, 1953, Serial No. 337,901

11 Claims. (Cl. 73—141)

The present invention relates to a remote indicating force measuring instrument.

More particularly, the invention relates to a new and improved electro-mechanical force measuring instrument for use with dynamometers and the like, for providing an electrical indication of the forces acting on the instrument through a remote station.

Remotely indicating force measuring instruments are presently available in industry; however, all of the known instruments of this general type are not entirely satisfactory due to a number of objectionable characteristics inherent in the design and construction of such instruments. One such characteristic is a tendency of pulsations and fluctuations of the load acting on the instrument, to adversely affect the indicator thereof. Another undesirable characteristic of the known instruments of this type, is the requirement for the application of the full rated force in order to calibrate the instrument.

It is, therefore, one object of the present invention to provide a new and improved remote indicating, electrically operable, force measuring instrument which includes a means for overcoming the effects of pulsations and variations in the load applied to the instrument whereby such undesirable effects do not harm the indicating components of the instrument.

A still further object of the invention is to provide a new and improved force measuring instrument which includes a means for readily calibrating the instrument without requiring application of the forces equal to the full rating of the instrument.

In practicing the invention, a remote indicating force measuring gauge is provided which includes a supporting base member having an upright portion. A lever arm is secured to the upright portion of the base member in cantilever fashion, and is constructed in a manner such that the lever arm has a larger dimension cross-sectional portion adjacent the upright portion of the base member, and a relatively thinner cross-sectional portion adjacent the free end thereof. Means are provided for applying the force to be measured to the lever arm at a point intermediate the secured and free ends thereof, and a means is also provided for applying a calibrating force to the end of the lever arm. By this construction, flexure of the lever arm provides an indication of the force desired to be measured, and in order to develop a perceptible indication or measurement of this force, an electrically operable strain gauge is provided which has the strain sensitive element secured to the free end of the lever arm and movable thereby.

Other objects, features, and attendant advantages of this invention will be appreciated more readily as the same becomes better understood by reference to the following detailed description, when considered in connection with the accompanying drawings, wherein like parts are identified by the same reference character, and wherein.

Figure 1:
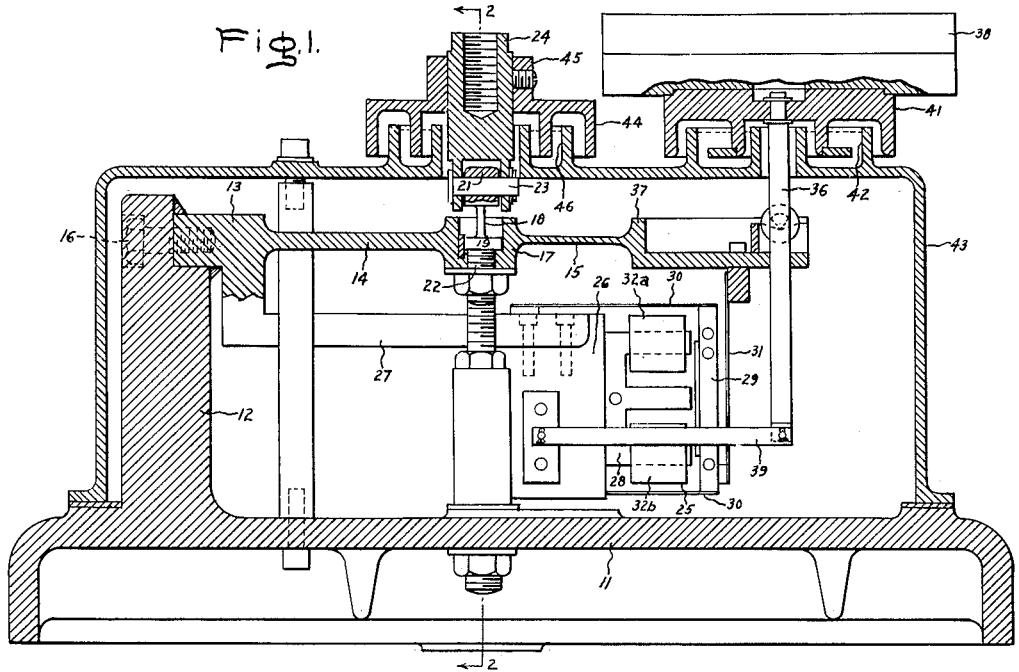
Fig. 1 is a sectional view of a remotely indicating, electrically operable force measuring instrument constructed in accordance with the invention.

The remote indicating force measuring gauge illustrated in Fig. 1 includes a base member 11 having an upright portion 12. Secured to the upright portion 12 is a lever arm 13 which is comprised of a thick cross-sectional segment 14, and an undercut, relatively thin, cross-sectional segment 15. The lever arm 13 is secured to upright portion 12 of the base member by a threaded stud, indicated at 16 by the dotted lines, and only for assembly purposes by welding, and the two major segments thereof 14 and 15, are designed in a manner such that the two segments have a predetermined ratio of stiffness. A means is supplied for applying the force to be measured to the lever arm 13, and includes a first enlarged socket segment 17 formed at the juncture of the thick cross-sectional segment 14 and a thin cross-sectional segment 15. Supported in socket segment 17 is a connector 18 having an internally threaded base 19, and a head 21 having a bolt receiving aperture therein. The internally threaded base 19 cooperates with an externally threaded stud 22 to rigidly secure the connector 18 to the socket segment 17 and thereby secure the connector to lever arm 13, and the head 21 of the connector coacts with a bolt 23 to secure the connector to a load applying shaft 24.

Figure 3:
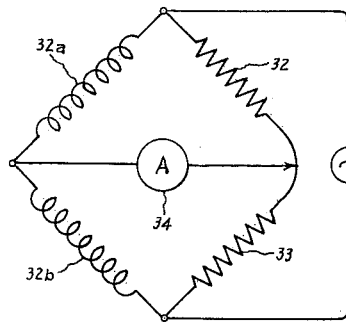
Fig. 3 is a schematic circuit diagram of a measuring circuit arrangement utilized to derive an indication of the force desired to be measured, and comprising a part of the force measuring instrument.

By reason of the above-described construction, a force applied through shaft 24 to the lever arm 13, causes the lever arm to flex an amount proportional to the value of the force applied through shaft 24. In order to measure flexure of the lever arm 13, an electrically operable strain gauge 25 is provided which is secured to a block 26 attached to upright portion 12 of the base by a supporting member 27. The strain gauge 25 includes an E-shaped core 28 mounted on block 26, and a movable armature 29 resiliently mounted on block 26 by a pair of flexible strips 30. The movable armature 29 is secured to the end of lever arm 13 by a bendable linkage 31 which serves to move armature 29 up or down in accordance with movement of the lever arm, but which prevents the application of any transverse forces to the armature. The strain gauge 25 further includes a pair of coils 32a and 32b that surround respective leg portions of the E-shaped core, and that are included in a balanced bridge measuring circuit arrangement shown in Fig. 3 of the drawings. The balanced bridge measuring circuit is comprised of a fixed resistor 32 that forms one arm of the measuring bridge, and a second fixed resistor 33 which forms the remaining arm, while the inductances 32a and 32b form the remaining arms of the bridge circuit. An indicating instrument 34 is connected across a pair of diagonally opposite terminals of the bridge circuit thus formed, and a source of alternating current electrical energy 35 is connected across the remaining pair of diagonally opposite terminals. With the coil windings of the strain gauge 25 connected in such a measuring bridge arrangement, movement of the strain sensitive armature 29 varies the reluctance of the magnetic paths between coils 32a and 32b and hence the inductance of these coils to produce an unbalance of the current flowing through such coils. Because the bridge circuit has been previously balanced for a no flexure condition, the amount of unbalance produced by movement of the strain sensitive movable armature 29 thereby provides an indication of the amount of such flexure, and hence of the value of the force applied through shaft 24 to the lever arm 13.

Because of the fact that pulsations and fluctuations of the force applied through shaft 24 to lever arm 13 cause lever arm 13 to vibrate, and hence results in vibrating the strain sensitive armature 29 to thereby affect the indication appearing on the indicating instrument 34 so as to render measurement of the force rather difficult, some means must be provided for reducing effect of such pulsations and fluctuation to a minimum. Additionally, with nothing more than has been described, in order to calibrate the indicating instrument 34 in terms of force applied to the shaft 24, it would be necessary to utilize forces equal to the full rating of the measuring system. In order to overcome these difficulties means are provided which comprise a connecting rod 36 secured through a knife edge connection to a second enlarged socket segment 37 formed on the free end of lever arm 13, connecting rod 36 has a weight receiving platform 38 secured to one end thereof, and has the remaining end thereof pivotally connected to a link 39 which is in turn pivotally connected to the block 26. By this arrangement, a known weight applied to the weight receiving platform 38 will deflect the lever arm 13 the same amount as a correspondingly greater load applied to the shaft 24. This effect is obtained by reason of the fact that the undercut thin cross-sectional segment 15 of the lever arm can be flexed at a much smaller force than the thicker cross-sectional segment 14. Hence a calibration check can be made on the instrument with a weight applied to the weight receiving platform 38 which is as small as ½₀₀ths of the rated force applied to the instrument through the shaft 24, thereby allowing the instrument to be calibrated, and the calibration of the instrument checked, without requiring the use of forces equal to the full rating of the measuring instrument.

In order to overcome the effects of pulsations or fluctuations of the load applied through shaft 24 to lever arm 13, a dashpot arrangement 41 is formed on the under surface of the weight receiving platform 38, and cooperates with an oil reservoir 42 formed on the upper surface of a housing 43 surrounding the lever arm 13 to provide a damping action. From an inspection of Fig. 1 of the drawings, it can be readily appreciated that only a comparatively small damping force is required at the end of lever arm 13 in order to damp out comparatively large vibrating forces applied to the shaft 24 to the lever arm due to the fact that the undercut thinner cross-sectional segment 15 flexes more readily than does the thicker cross-sectional segment 14 of the lever arm, and since the damping forces developed with the dashpot 41 and oil in the oil reservoir 42 are applied to the end of the lever arm, such damping forces act through the thinner cross-sectional portion segment 15 to prevent substantial vibration of the end of the lever arm, and hence strain sensitive element 27, by the vibrating forces applied through shaft 24.

Figure 2:
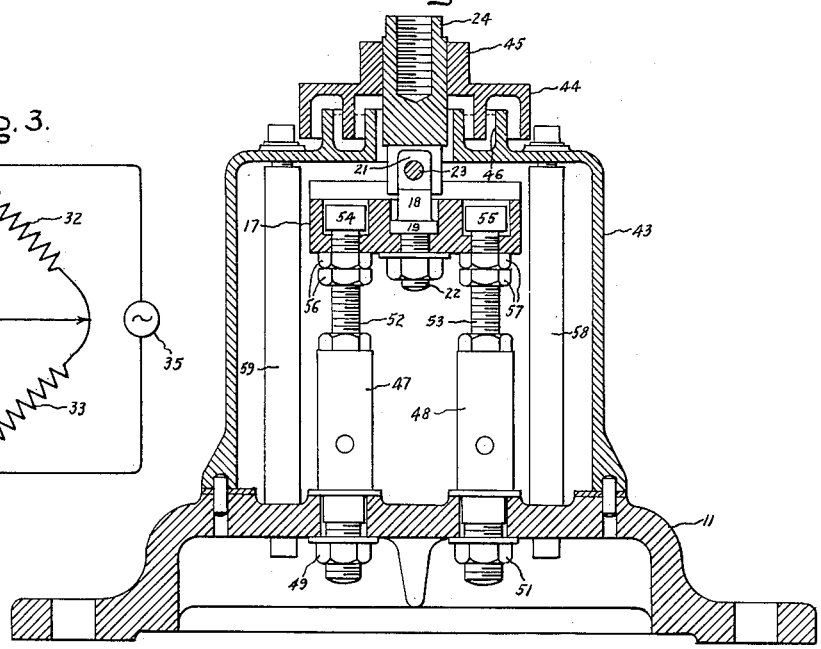
Fig. 2 is a cross-sectional view of the force measuring instrument illustrated in Fig. 1, the cross section being taken through plane 2—2.

In addition to the above-described structure, a movement limiting stop is provided which cooperates with the lever arm to prevent the same from being deflected to a point that would change the ratio of stiffness of the larger and thinner cross-sectional segments 14 and 15. This movement limiting stop is best shown in Fig. 2 of the drawing and comprises a pair of internally threaded posts 47 and 48 which are secured to base 11 by a pair of locking nuts 49 and 51, respectively. The posts 47 and 48 have a respective externally threaded stud 52 and 53 respectively secured thereto which have enlarged head portions 54 and 55 respectively that are positioned in cavities formed in the enlarged socket portion 17 and lever arm 13. Each of the threaded studs 54 and 55 may be threadably secured within the respective posts 47 and 48 to a distance that allows the enlarged head portions 54 and 55 thereof to rest against the bottom of the cavities formed in the large socket portion of lever arm 13 when the lever arm is in the idle position. Enlarged head portions then cooperate with a pair of locking nuts 56 and 57 respectively to limit the amount of movement of the lever arm 13. Additionally, a number of supporting posts such as 58 and 59 may be secured intermediate the base member 11 and the top of housing 43 so as to brace the same to withstand the forces acting thereagainst by reason of the damping arrangement secured to shaft 24 or connecting rod 36.

In operation, the force to be measured is applied through the shaft 24 to lever arm 13 and causes the same to be flexed an amount proportional to the value of the force. Flexure of the lever arm 13 causes downward movement of the strain sensitive armature 29 of strain gauge 25, and results in producing an unbalance in the measuring bridge circuit arrangement shown in Fig. 3. This amount of unbalance produces an indication on the indicating instrument 34 which is proportional to the amount of flexure of lever arm 13 and hence is proportional to the value of the force applied through shaft 24. In the event that the force or load applied through shaft 24 is pulsating or fluctuating so as to set up vibration in the lever arm 13 thereby producing erroneous indications on the indicating instrument 34, the damping arrangement comprised by dashpot 41 on the under surface of weight receiving platform 38 and the oil reservoir 32 coacts through the thinner cross-sectional segment 15 of the lever arm to dampen out such vibrations, and reduce the effect of the same to a minimum. In addition to serving as a damping arrangement, the provision of the weight receiving platform 38 and the undercut thinner cross-sectional portion for segment 15 of lever arm 13 allows the force measuring gauge to be calibrated with weights which are considerably smaller than the forces normally required to deflect the lever arm 13 a corresponding amount when applied through the force transmitting shaft 24.

From the foregoing description, it can be readily appreciated that the invention provides a new and improved remote indicating force measuring gauge which includes an improved means for overcoming the effects of pulsations and variations in the load applied to the measuring instrument. Further, the improved force measuring gauge is designed in a manner such that it can be readily calibrated without requiring the application of forces equal to the full rating of the instrument, and need only have relatively small calibrating forces applied thereto. Consequently, it can be appreciated that the invention overcomes many of the undesirable characteristics of force measuring instruments presently available in the industry.

Obviously, other modifications and variations to the present invention will be suggested to those skilled in the art in the light of the above teachings. It is, therefore, to be understood that changes may be made herein which are within the full intended scope of the invention as defined by the appended claims.

What I claim as new and desire to secure by Letters Patent of the United States is:

1. A remote indicating force measuring gauge including a supporting base member having an upright portion, a lever arm secured to the upright portion of said base member in a cantilever fashion, said lever arm having a larger dimension cross-sectional portion adjacent the upright portion of said base member and having a relatively thinner cross-sectional portion adjacent the free end thereof, means for applying the force to be measured to said lever arm at a point intermediate the secured and free ends thereof, means for applying a calibrating force to said lever arm at the free end thereof, and an electrically operable strain gauge having the strain sensitive element thereof secured to the free end of said lever arm and movable thereby.

2. A remote indicating force measuring gauge including a supporting base member having an upright portion, a lever arm secured to the upright portion of said base member in cantilever fashion, said lever arm having a thick cross-sectional segment adjacent the upright portion of said base member and having an undercut relatively thin cross-sectional segment adjacent the free end thereof, means for applying the force to be measured to said lever arm at the juncture of said thick and thin cross-sectional segments, means for applying a calibrating force to said lever arm at the free end thereof, and an electrically operable strain gauge having the strain sensitive element thereof secured to the free end of said lever arm and movable thereby.

3. A remote indicating force measuring gauge including a supporting base member having an upright portion, a lever arm secured to the upright portion of said base member in cantilever fashion, said lever arm having a larger dimension cross-sectional portion adjacent the upright portion of said base member and having a relatively thinner cross-sectional portion adjacent the free end thereof, means for applying the force to be measured to said lever arm at a point intermediate the secured and free ends thereof, means operatively connected to the free end of said lever arm for damping vibrations thereof, and an electrically operable strain gauge having the strain sensitive element thereof secured to the free end of said lever arm and movable thereby.

4. A remote indicating force measuring gauge including a supporting base member having an upright portion, a lever arm secured to the upright portion of said base member in cantilever fashion, said lever arm having a larger dimension cross-sectional portion adjacent the upright portion of said base member and having a relatively thinner cross-sectional portion adjacent the free end thereof, means for applying the force to be measured to said lever arm at a point intermediate the secured and free ends thereof, means for applying a calibrating force to said lever arm at the free end thereof, damping means operatively connected to and cooperating with said calibrating force applying means for damping vibrations of said lever arm, and an electrically operable strain gauge having the strain sensitive element thereof secured to the free end of said lever arm and movable thereby.

5. A remote indicating force measuring gauge including a supporting base member having an upright portion, a lever arm secured to the upright portion of said base member in cantilever fashion, said lever arm comprising a larger dimension cross-sectional portion adjacent the upright portion of said base member and a relatively thinner cross-sectional portion adjacent the free end thereof, said thinner cross-sectional portion of said lever arm having a predetermined ratio of stiffness relative to said larger dimension, means for applying the force to be measured to said lever arm at a point intermediate the secured and free ends thereof, means for applying a calibrating force to said lever arm at the free end thereof, damping means operatively connected to and cooperating with said calibrating force applying means for damping vibrations of said lever arm, an electrically operable strain gauge having the strain sensitive element thereof secured to the free end of said lever arm and movable thereby, and a movement limiting stop cooperating with said lever arm to prevent the same from being deflected to a point that would change the ratio of stiffness of the larger and thinner cross-sectional portions thereof.

6. A remote indicating force measuring gauge including a supporting base member having an upright portion, a lever arm secured to the upright portion of said base member in cantilever fashion, said lever arm having a larger dimension cross-sectional portion adjacent the upright portion of said base member and having a relatively thinner cross-sectional portion adjacent the free end thereof, a load applying shaft connected to said lever arm at a point intermediate the secured and free ends for applying the force to be measured thereby, a connecting rod connected to the free end of said lever arm and having a weight supporting platform secured thereto, a housing surrounding said lever arm and having openings therein for receiving said load applying shaft and said connecting rod, an oil reservoir formed on said housing around the opening receiving said connecting rod, said oil reservoir and the bottom surface of said weight receiving platform coacting to provide a damping action, and an electrically operable strain gauge having the strain sensitive element thereof secured to the free end of said lever arm and movable thereby.

7. A remote indicating force measuring gauge including a supporting base member having an upright portion, a lever arm secured to the upright portion of said base member in cantilever fashion, said lever arm having a thick cross-sectional segment adjacent the upright portion of said base member and having an undercut relatively thin cross-sectional segment adjacent the free end thereof, a load applying shaft connected to said lever arm at the junction of said thick and thin cross-sectional segments for applying the force to be measured thereto, a connecting rod connected to the free end of said lever arm and having a weight supporting platform secured thereto, a housing surrounding said lever arm and having openings therein for receiving said load applying shaft and said connecting rod, an oil reservoir formed on said housing around the opening receiving said connecting rod, said oil reservoir and the bottom surface of said weight receiving platform coacting to provide a damping action.

8. A remote indicating force measuring gauge including a supporting base member having an upright portion, a lever arm secured to the upright portion of said base member in cantilever fashion, said lever arm having a thick cross-sectional segment adjacent the free end thereof, a load applying shaft connected to said lever arm at the junction of said thick and thin cross-sectional segment for applying the force to be measured thereto, a connecting rod connected to the free end of said lever arm and having a weight supporting platform secured thereto, a housing surrounding said lever arm and having openings therein for receiving said load applying shaft and said connecting rod, an oil reservoir formed on said housing around the opening receiving said connecting rod, said oil reservoir and the bottom surface of said weight receiving platform coacting to provide a damping action, and a movement limiting stop cooperating with said lever arm to prevent the same from being deflected to a point that would change the ratio of stiffness of the larger and thinner cross-sectional portions thereof.

9. A remote indicating force measuring gauge including a supporting base member having an upright portion, a lever arm secured to the upright portion of said base member in cantilever fashion, said lever arm comprising two portions having different degrees of stiffness with the stiffer of said portions being adjacent the upright portion of said base member, means for applying the force to be measured to said lever arm at a point intermediate the secured and free ends thereof, means for applying a calibrating force to said lever arm at the free end thereof, and an electrically operable strain gauge having the strain sensitive element thereof secured to the free end of said lever arm and movable thereby.

10. A remote indicating force measuring gauge including a supporting base member having an upright portion, a lever arm secured to the upright portion of said base member in cantilever fashion, said lever arm comprising two portions having different degrees of stiffness with the stiffer of said portions being adjacent the upright portion of said base member, means for applying the force to be measured to said lever arm at a point intermediate the secured and free ends thereof, means operatively connected to the free end of said lever arm for damping vibrations thereof, and an electrically operable strain gauge having the strain sensitive element thereof secured to the free end of said lever and movable thereby.

11. A remote indicating force measuring gauge including a supporting base member having an upright portion, a lever arm secured to the upright portion of said base member in cantilever fashion, said lever arm comprising two portions having different degrees of stiffness with the stiffer of said portions being adjacent the upright portion of said base member, means for applying the force to be measured to said lever arm at a point intermediate the secured and free ends thereof, means for applying a calibrating force to said lever arm at the free end thereof, damping means operatively connected to and cooperating with said calibrating force applying means for damping vibrations of said lever arm, and an electrically operable strain gauge having the strain sensitive element thereof secured to the free end of said lever arm and movable thereby.

References Cited in the file of this patent

UNITED STATES PATENTS

| | | |
|---|---|---|
| 1,558,146 | Craig | Oct. 20, 1925 |
| 1,619,122 | Hem | Mar. 1, 1927 |
| 2,598,812 | Marco et al. | June 3, 1952 |
| 2,611,266 | Wiancho | Sept. 23, 1952 |
| 2,620,657 | Stovall | Dec. 9, 1952 |
| 2,653,475 | Kraus | Sept. 29, 1953 |
| 2,672,755 | Hohner | Mar. 23, 1954 |